US008597409B2

(12) United States Patent
Vanderstraeten

(10) Patent No.: US 8,597,409 B2
(45) Date of Patent: Dec. 3, 2013

(54) COMPRESSOR INSTALLATION WITH A DRYER AND METHOD FOR DRYING OF COMPRESSED GASSES

(75) Inventor: Bart Etienne Agnes Vanderstraeten, Baal (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 141 days.

(21) Appl. No.: 13/386,726

(22) PCT Filed: Jul. 30, 2010

(86) PCT No.: PCT/BE2010/000055
§ 371 (c)(1),
(2), (4) Date: Jan. 24, 2012

(87) PCT Pub. No.: WO2011/017784
PCT Pub. Date: Feb. 17, 2011

(65) Prior Publication Data
US 2012/0125195 A1 May 24, 2012

(30) Foreign Application Priority Data
Aug. 11, 2009 (BE) .................................. 2009/0482

(51) Int. Cl.
B01D 53/06 (2006.01)
B01D 53/26 (2006.01)

(52) U.S. Cl.
USPC .................................. 95/113; 95/123; 96/125

(58) Field of Classification Search
USPC .................. 95/113–115, 121–123, 125, 148; 96/125, 144; 34/80, 472, 473
See application file for complete search history.

(56) References Cited

U.S. PATENT DOCUMENTS

| 4,409,006 | A  | * | 10/1983 | Mattia ............................. 95/113 |
| 4,729,774 | A  |   | 3/1988  | Cohen et al. |
| 5,667,560 | A  | * | 9/1997  | Dunne ............................ 95/113 |
| 5,701,762 | A  | * | 12/1997 | Akamatsu et al. .............. 62/636 |
| 6,165,254 | A  |   | 12/2000 | Kawakami et al. |
| 6,294,000 | B1 | * | 9/2001  | Klobucar ........................ 95/113 |
| 6,666,911 | B2 | * | 12/2003 | Chou et al. ..................... 96/125 |
| 7,569,095 | B2 | * | 8/2009  | Vanderstraeten et al. ...... 95/107 |
| 7,789,942 | B2 | * | 9/2010  | Vanderstraeten et al. ...... 95/113 |
| 8,328,904 | B2 | * | 12/2012 | Griffiths et al. ................. 95/10 |

FOREIGN PATENT DOCUMENTS

| JP | 5200233    | 8/1993 |
| JP | 2002186822 | 7/2002 |

OTHER PUBLICATIONS

International Search Report in PCT/BE2010/000055, Dec. 23, 2010.
IPRP in PCT/BE2010/000055, (no date).

* cited by examiner

Primary Examiner — Frank Lawrence, Jr.
(74) Attorney, Agent, or Firm — Bacon & Thomas, PLLC

(57) ABSTRACT

Compressor installation including a compressor and a dryer which are mutually connected via a pressure pipe. The dryer includes a housing with a drying zone and a regeneration zone, and a rotating drum with a drying agent. The regeneration zone includes a first subzone and a second subzone. Two regeneration conducts connect to the pressure pipe, respectively a first regeneration conduit which connects to an inlet of the first subzone and through which compressed gas having a first temperature is guided, and a second regeneration conduit which connects to an inlet of the second subzone. The second regeneration conduit has a heating element for heating compressed gas flowing through the second regeneration conduit to a second temperature which is higher than the first temperature.

14 Claims, 4 Drawing Sheets

COMPRESSOR INSTALLATION WITH A DRYER AND METHOD FOR DRYING OF COMPRESSED GASSES

The present invention relates to a compressor installation comprising a dryer, and to a method for drying a compressed gas.

More specifically, the invention relates to a compressor installation comprising a compressor and a dryer, mutually connected by means of a pressure pipe, whereby said dryer comprises a rotating drum provided with regenerable drying agent, which drying agent is guided alternately through two zones of the dryer by rotation of the drum, whereby in one zone, designated as the drying zone, said drying agent is used to dry a compressed gas, and in the other zone, more specifically the regeneration zone, said drying agent is regenerated by bringing said drying agent into contact with a hot gas.

Because usually the drying drum is rotating slowly, in a continuous way, however sometimes also intermittently with pauses, a drying agent that has been recently dried will end up in the drying zone.

Traditionally, the major portion of the compressed gas, coming from the compressor, is cooled to be guided subsequently through the drying zone of the dryer, whereby the drying agent, present in the drying zone, extracts moisture from this gas, which results in a dry gas with a low pressure dew point.

Traditionally, the remaining portion of the compressed gas, which is hot due to compression in the compressor, is guided through the regeneration zone of the dryer, whereby this gas evaporates the moisture present in the drying agent by means of the compression heat in this gas, and as a result of which the drying agent is regenerated to be used again subsequently, in a new cycle in the drying zone, for drying the compressed gas.

Apparently, the heat of the compressed gas is used for regenerating the drying agent in the regeneration zone, whereby it should be noted that as the temperature of the compressed gas rises, the drying process improves and the efficiency of the installation correspondingly increases.

The temperature of the compressed gas used for regeneration can be raised by placing a heating element before guiding this gas through the regeneration zone.

As such, the efficiency of the adsorption dryer can be increased, which in practice means that a lower pressure dew point for the dried gas can be achieved. For example, under certain conditions, the pressure dew point can be −25° C. and the regeneration temperature can be 150° C. By adding a heating element and by increasing the regeneration temperature with 30° C. to 180° C., the pressure dew point can be lowered with 10° C. to −35° C.

In turbo compressors and low pressure applications the temperature of the compressed gas is often too low for ensuring sufficient regeneration, such that the compressed gas has to be heated by heating elements too before being guided through the regeneration zone of the dryer.

A disadvantage is that a heating element is high current consuming. Typically, said current consumption is 8 to 15% of the nominal energy- and/or current consumption of the compressor installation, which is relatively very high.

An additional disadvantage is that such heating element is large and expensive.

The compressor installation and method according to the invention aim to overcome one or more of said and/or other disadvantages.

Therefore, the invention relates to a compressor installation comprising a compressor and a dryer, connected mutually by means of a pressure pipe, in which, according to the flow direction of compressed gas coming from the compressor, are provided successively a cooler and a water separator, whereby said dryer is provided with a housing, with therein a drying zone and a regeneration zone, and a drum rotating in the housing, with therein a regenerable drying agent, and driving means for rotation of the drum such that the drying agent is moved successively through the drying zone and the regeneration zone, whereby, according to the specific characteristic of the invention, said regeneration zone comprises at least two subzones, a first subzone and a second subzone, respectively, and, whereby, at least two regeneration conducts connect to said pressure pipe, upstream from said cooler, to branch off at least two flow portions of hot, compressed gas coming from the compressor, a first regeneration conduit and a second regeneration conduit respectively, the first regeneration conduit which connects to an inlet of the first subzone and through which a first flow portion of compressed gas having a first temperature is guided, and a second regeneration conduit which connects to an inlet of the second subzone; and, whereby said second regeneration conduit comprises a heating element for heating a second flow portion of compressed gas flowing through said second regeneration conduit, to a second temperature, which is higher than the first temperature.

An advantage of a compressor installation according to the invention is that the gas to be dried can be dried more efficiently because of the two subzones that are realised in the regeneration zone, whereby the temperature of the gas used for regeneration is different in each subzone.

Another advantage is that not the whole gas flow has to be heated, however, only the portion of the gas flow having a higher temperature has to be heated, or the remaining flow has to be heated less. This results in a considerable energy saving.

This results in a number of advantages because a smaller heating element can be used, which results in saving of energy and material costs and in a more compact installation.

The invention also relates to a method for drying a compressed gas coming from a compressor by means of a dryer which is provided with a housing with therein a drying zone and a regeneration zone, and a drum rotating in the housing, with a regenerable drying agent, and driving means for rotation of the drum, such that the drying agent is moved successively through the drying zone and the regeneration zone, whereby this method comprises the following steps:
drying compressed gas by cooling said gas and afterwards guiding through the drying zone;
guiding an amount of hot, compressed gas coming from the compressor through the regeneration zone for regenerating the drying agent,
with the characteristic that the method further comprises the following steps:
dividing the regeneration zone in at least two subzones, a first subzone and a second subzone, respectively,
guiding a first flow portion of hot, compressed gas having a first temperature $T_1$ through the first subzone,
guiding a second flow portion of hot compressed gas having a second temperature $T_2$ through the second subzone, whereby the second temperature $T_2$ is higher than the first temperature $T_1$.

In order to better explain the characteristics of the invention, a number of preferred embodiments of a compressor installation according to the invention as well as a method for drying a compressed gas are described by way of example, without being imitative in any way, with reference to the accompanying drawings, whereby:

Figure 1:
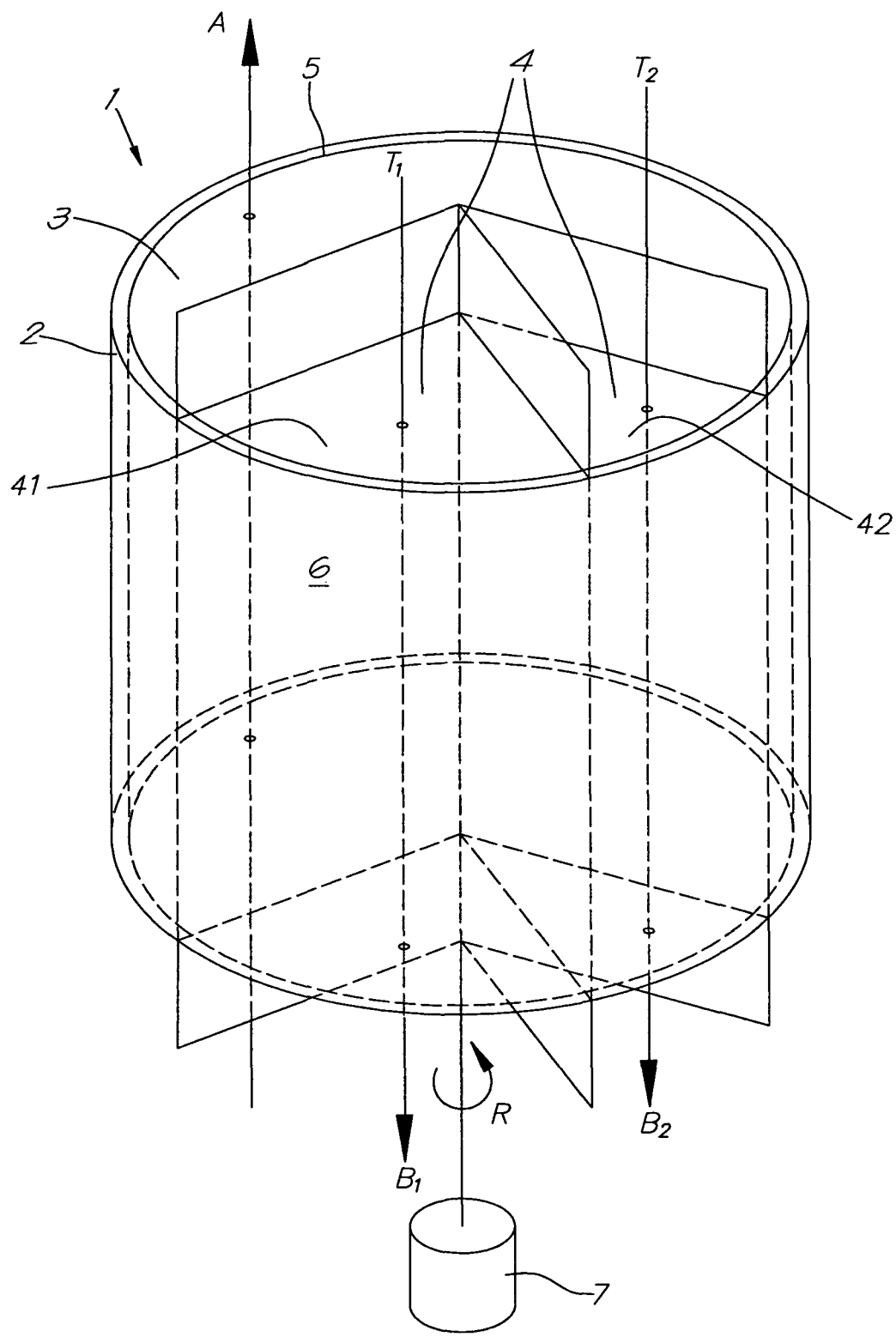
FIG. 1 represents schematically a part of a dryer forming part of a compressor installation according to the invention.

FIG. 1 shows a dryer 1 for compressed gas which forms part of a compressor installation according to the invention. The dryer 1 is provided with a housing 2 with therein a drying zone 3 and a regeneration zone 4.

In the housing 2 a rotating drum 5 is mounted in which a drying agent 6 is provided. The dryer 1 is further provided with driving means 7 for rotation of the drum 5, for example in the form of an electric motor, in such a way that the drying agent 6 is moved successively through the drying zone 3 and the regeneration zone 4.

Typically, the drying agent 6 used according to this invention, is a material with high adsorption—of adsorption capacity. Usually, it concerns granular materials having a proportionally high rate of inner contact surface, whereby the porous contact surface absorbs moisture when the gas is guided through the drying zone 3. Examples of such materials are active alumina (an amorphous aluminium oxide in non-steady state), silica gels and zeolites.

Figure 3:
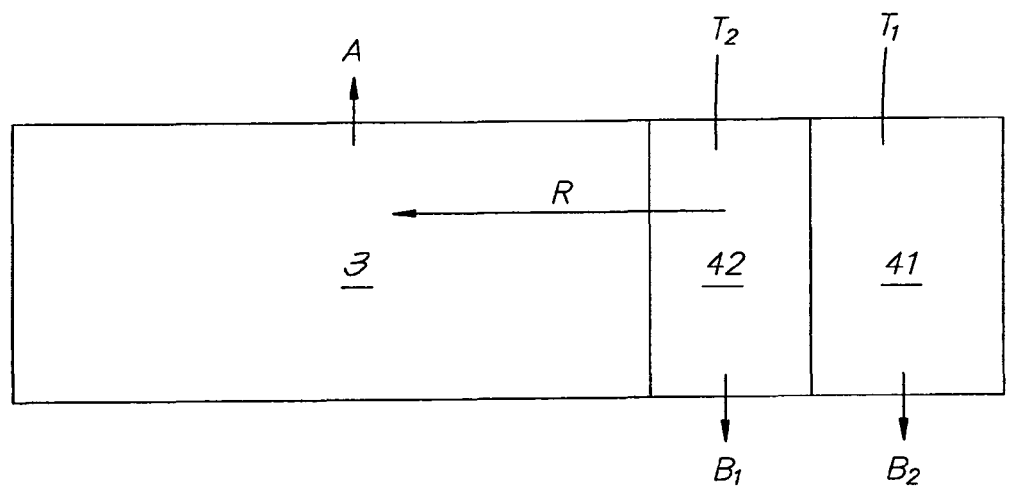
FIGS. 3 and 4 represent the drying drum according to FIGS. 1, 2, respectively, in unrolled version.

During the use of the dryer 1 an amount of compressed gas is guided through the drying zone 3, in this case according to the direction indicated by arrow A. This is also illustrated by means of FIGS. 3 and 5.

Said regeneration zone 4 comprises at least two subzones, 41 and 42, respectively, a first subzone 41 through which gas having a first temperature $T_1$ is guided, in this case following arrow $B_1$, and a second subzone 42 through which gas having a second temperature $T_2$ is guided, in this example in the direction indicated by arrow $B_2$, whereby the second temperature $T_2$ is higher than the first temperature $T_1$.

In a preferred embodiment the circumferential angle covered by the second subzone 42 is situated between 5° and 30°, even more preferably between 15° and 20°.

By "circumferential angle" is meant here the angle covered by a segment of the second subzone 42, which segment is formed in a plane, perpendicular to or almost perpendicular to the height direction of the drum 5, or in other words, perpendicular to or almost perpendicular to the rotation axis of said drum 5.

Preferably said second subzone 42 is provided at the end of the regeneration zone.

By the term "the end of the regeneration zone", is meant the area of regeneration zone 4 wherein the regenerated drying agent is situated just before it leaves the regeneration zone 4 to be guided subsequently into the drying zone 3.

As such, the drum 5 preferably rotates in the sense of arrow R in FIG. 1. As a consequence thereof, the drying agent 6 moves through the dryer according to the sense of arrow R in FIG. 3. In this way, the second subzone 42 is situated at the end of regeneration zone 4.

In a preferred embodiment, the drying drum 5 is mainly cylindrical and the different zones are axially separated in a known way.

Figure 5:
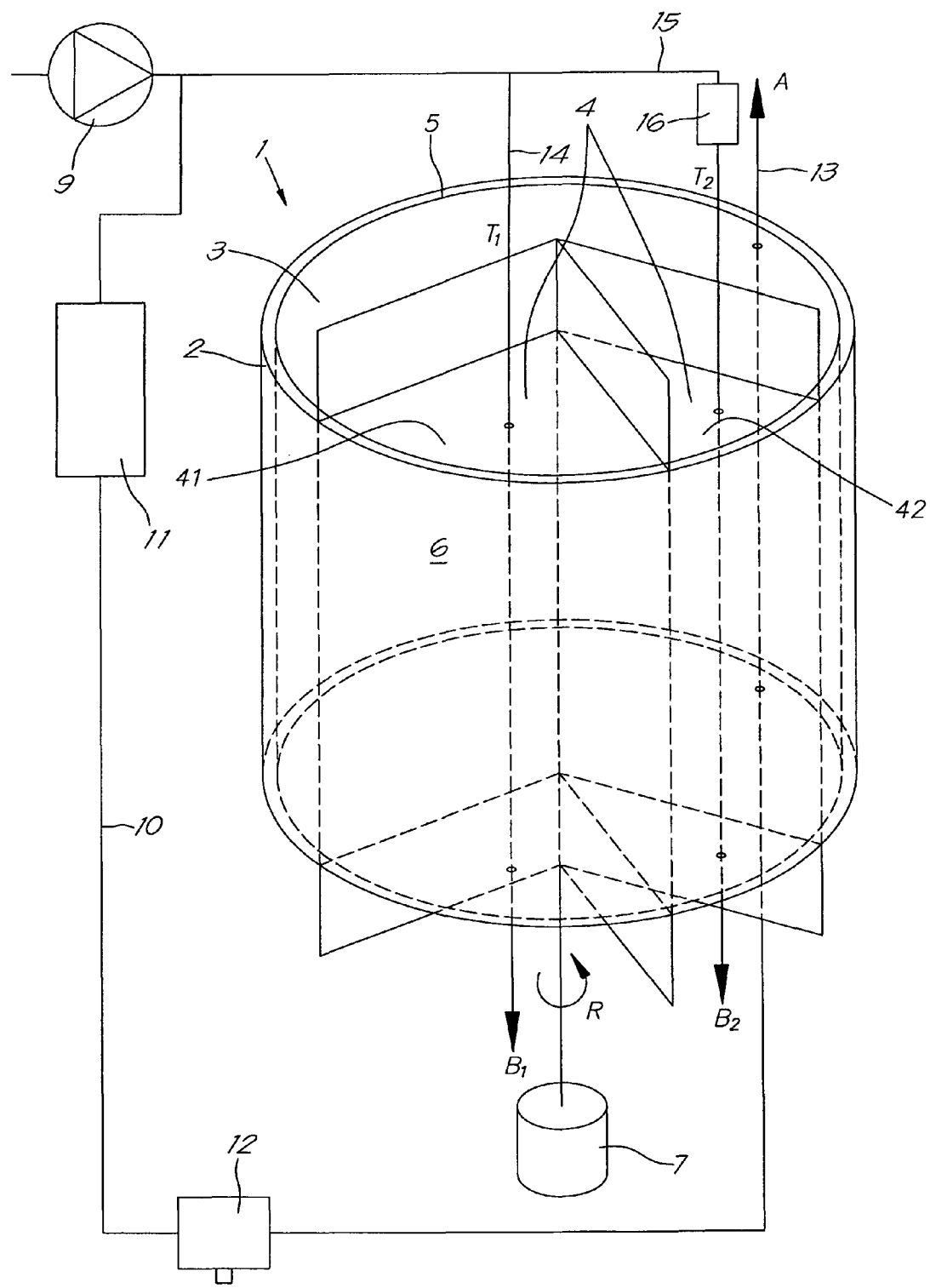
FIG. 5 represents a compressor installation according to the invention.

In FIG. 5 a compressor installation 8 according to the invention is represented which is provided with a compressor 9 and a dryer 1, which are mutually connected by means of a pressure pipe 10 in which, successively, according to the flow direction of the compressed gas coming from the compressor 9, are provided a cooler 11 and a water separator 12.

The pressure pipe 10 connects to the dryer 1, at an inlet of the drying zone 3. The drying zone 3 also shows an outlet to which an outlet conduct 13 connects for discharging dried compressed gas for all kinds of applications.

According to a particular aspect of the invention, at least two regeneration conducts, 14 and 15, connect to the pressure pipe 10, upstream of said cooler 11 and downstream of the compressor 9.

A first said regeneration conduit 14 connects to an inlet of said first subzone 41, whereas a second said regeneration conduit 15 connects to an inlet of said second subzone 42.

The second regeneration conduit 15 is provided with a heating element 16. The first regeneration conduit 14 and/or the pressure pipe 10 are preferably not provided with a heating element.

The method for drying a compressed gas is simple and as follows.

Hot, compressed gas coming from the compressor 9 is guided via the pressure conduit 10 successively through the cooler 11 and the water separator 12.

Subsequently, the cooled portion of compressed gas is guided through said drying zone 3, in this case in the direction of arrow A in FIGS. 1 and 5, where a drying of this gas occurs, after which the dried compressed gas leaves the dryer 1 via outlet conduct 13 for further use for all kinds of applications, such as for feeding a compressed air net, for driving pneumatic tools, and the like.

The drum 5 is rotated by the driving means 7 as a result of which the drying agent 6 is moved successively through the drying zone 3 and the regeneration zone 4.

An amount of gas is guided through the regeneration zone 4 for regenerating the drying agent 6, whereby through the first subzone 41 an amount of gas having a first temperature $T_1$ is guided in the direction of arrow $B_1$, and through the second subzone 42 an amount of gas having a second temperature $T_2$ is guided in the direction of arrow $B_2$.

The essential aspect of the invention is that the second temperature $T_2$ is higher than the first temperature $T_1$.

This is accomplished as follows, as represented in FIG. 5.

A first flow portion of hot, compressed gas, coming from the compressor, is branched off via said first regeneration conduit 14. Thanks to the compression heat of the compressed gas, this flow portion is able to regenerate drying agent moving through the first subzone 41.

A second flow portion of hot, compressed gas, coming from the compressor 9, is branched off from the pressure pipe 10, via the second regeneration conduit 15, and is guided through the heating element 16 to be heated to a temperature $T_2$ which is higher than the temperature $T_1$ of the first flow portion which flows through the first regeneration conduit 14.

The regeneration gas which leaves the respective subzones 41 and 42, can be blown off into the atmosphere or can be recuperated by for example mixing it, whether or not after expansion and/or cooling, with gas which is sucked in at an inlet side of the compressor 9.

Drying of the compressed gas by applying the method according to the invention is done with a higher efficiency than in the known methods for drying a compressed gas by means of a dryer with a drying drum, because only the gas present in the second subzone 42 is heated to a temperature $T_2$, by means of a heating element 16 provided to that end.

As a result, a sufficient regeneration of the drying agent 6 in the regeneration zone 4 is achieved without having to provide a heating element for the first subzone 41.

Anyhow, energy will be saved thanks to the fact that only a portion of the complete regeneration flow has to be heated to temperature $T_2$.

Figure 2:
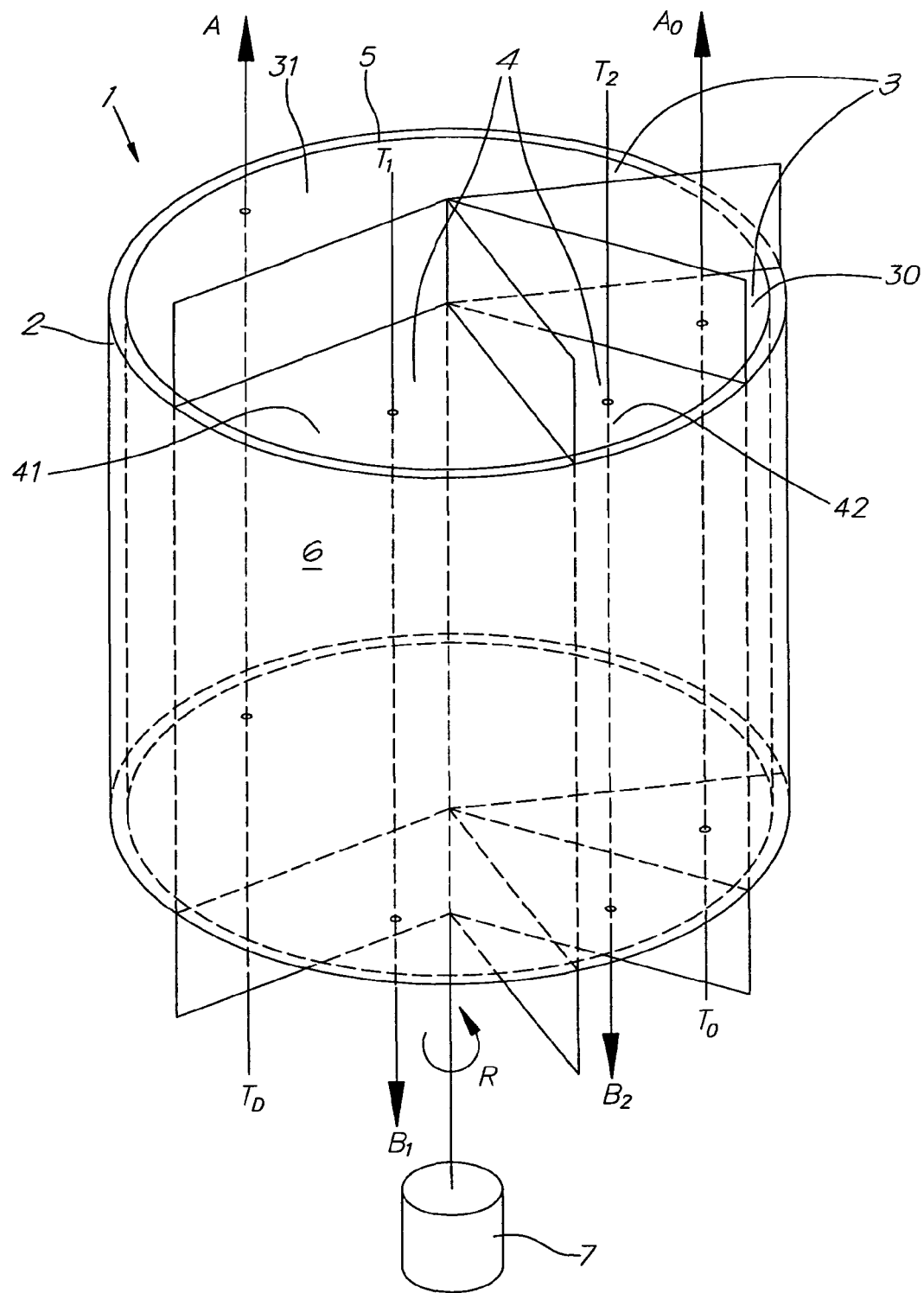
FIG. 2 represents a variant of FIG. 1.
Figure 4:
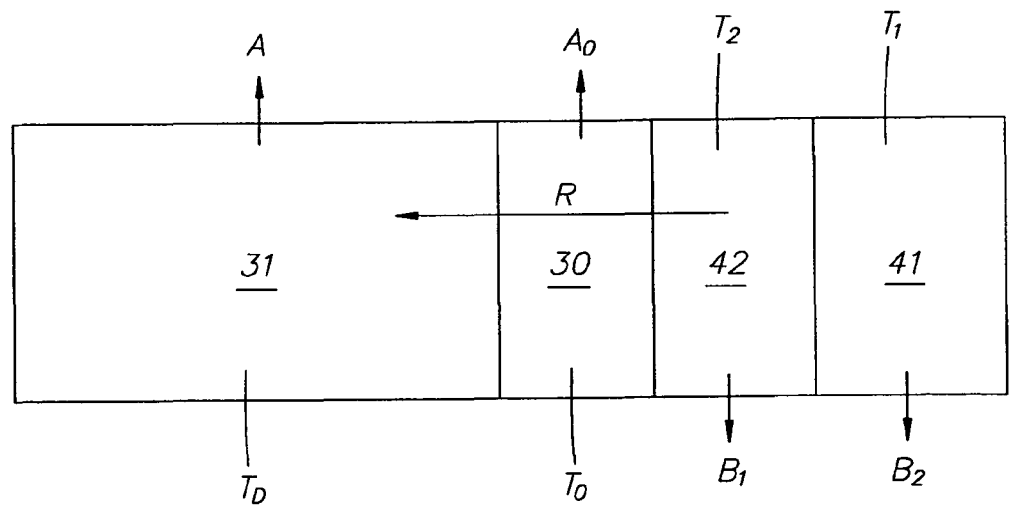

FIGS. 2 and 4 show an alternative embodiment of a dryer 1 of a compressor installation according to the invention whereby, in this case, besides the divided regeneration zone 4, the drying zone 3 is divided into a first zone 30 and a second zone 31.

The method for drying a compressed gas by means of a dryer as shown in FIG. 2, is almost identical to the method as described before, concerning the first embodiment of FIG. 1.

In this case a gas having a third temperature $T_0$ is guided through the first zone 30 of the drying zone 3, for example, however, not necessarily, in the direction indicated by arrow $A_0$.

In addition, a gas with a third temperature $T_D$ is guided through the second zone 31 of the drying zone 3, for example in the direction indicated by arrow A.

Preferably, the temperature $T_0$ in the first zone 30 is different from the temperature $T_D$ in the second zone 31. More specifically $T_0$ is preferably smaller than $T_D$.

According to a preferred aspect of the invention, the corresponding zones 30 and 31 are each provided with a separate inlet and with a separate outlet, however, it is also possible that they only have a separate inlet.

In this example the gas portion guided through the second zone 31 is cooled less than the gas portion guided through the first zone 30 or, alternatively, is not cooled at all. As such a small ratio of $T_0$ to $T_D$ is achieved, as a result of which the pressure dew point of the dried gas is improved better then compared to the case wherein $T_0$ and $T_D$ are cooled to the same value.

According to another preferred aspect of the invention, the drum 5 rotates in the direction of arrow R, as shown in FIG. 2. In this way, the drying agent 6 is moved successively through the first subzone 41 and the second subzone 42 of regeneration zone 4 to be guided subsequently through the first zone 30 and the second zone 31 of the drying zone 3. The preferred flow direction of the drying agent 6 through the dryer 1 is represented by arrow R in FIG. 4 as well.

In a practical embodiment of the invention, the circumferential angle covered by the first zone 30 is smaller than the circumferential angle covered by the second zone 31.

However, the present invention does not exclude that the drying zone 3 and/or the regeneration zone 4 comprises more than two zones 30-31 and 41-42 respectively.

It is also obvious that the presence of a zone 30 is not strictly required for the invention.

The sense of the arrows A, $B_1$, $B_2$ and $A_0$ can be changed independently from each other.

It is also obvious that the quantities of gas guided through the different zones can be mutually different, whereby factors, such as the flow-through and the dimensions of the corresponding zone, are of importance.

The present invention is by no means limited to the embodiments described by way of example and represented in the drawings, however, such a compressor installation can be realized in different variants without departing from the scope of invention.

The invention claimed is:

1. A compressor installation comprising:
    a compressor and a dryer which are mutually connected by a pressure pipe arranged to carry hot compressed gas discharged from the compressor;
    a cooler and a water separator located successively in said pressure pipe relative to the direction of flow of compressed gas discharged from the compressor;
    said dryer comprising a housing having a drying zone and a regeneration zone therein;
    a drum which is rotatable in said housing and having a regenerable drying agent therein;
    a driver arranged to rotate the drum so that the drying agent is moved successively through the drying zone and the regeneration zone;
    said regeneration zone comprising at least two subzones, including a first subzone and a second subzone, respectively;
    at least two regeneration conduits connected to said pressure pipe, upstream of said cooler, for branching off at least two flow portions of hot, compressed gas discharged from the compressor, respectively;
    a first regeneration conduit connected to an inlet of the first subzone and through which a first flow portion of compressed gas having a first temperature is guided;
    a second regeneration conduit which is connected to an inlet of the second subzone; and
    said second regeneration conduit having a heating element arranged to heat the second flow portion of compressed gas which flows through said second regeneration conduit, to a second temperature which is higher than said first temperature.

2. The compressor installation according to claim 1, wherein the second subzone is located at the end of regeneration zone.

3. The compressor installation according to claim 1, wherein the drying zone comprises at least two subzones, including a first zone and a second zone, respectively.

4. The compressor installation according to claim 3, arranged so that through the first zone of the drying zone a gas is guided having a third temperature that is different from a fourth temperature of the gas that is guided through the second zone of the drying zone.

5. The compressor installation according to claim 3, arranged so that the drying agent is moved successively through the first zone and the second zone of the drying zone.

6. The compressor installation according to claim 3, wherein the first zone of the drying zone covers a circumferential angle in said drum which is smaller than a circumferential angle of the second zone of the drying zone.

7. The compressor installation according to claim 1, wherein said second subzone covers a circumferential angle in said drum between 5° and 30°.

8. The compressor installation according to claim 1, wherein said second subzone covers a circumferential angle in said drum between 15° and 20°.

9. The compressor installation according to claim 1, wherein no heating element is provided in said first regeneration conduit.

10. A method for drying a compressed gas discharged from a compressor using a dryer which is provided with a housing having a drying zone and a regeneration zone therein, and a drum which is rotatable in the housing and has a regenerable drying agent therein, and a driver arranged to rotate the drum such that the drying agent is moved successively through the drying zone and the regeneration zone, comprising the steps:
    drying compressed gas discharged from the compression via a pressure pipe by cooling said gas and subsequently guiding it through the drying zone;
    guiding an amount of hot, compressed gas discharged from the compressor through the regeneration zone to regenerate the drying agent,
    dividing the regeneration zone into at least two subzones, including a first subzone and a second subzone, respectively;
    guiding a first flow portion of hot, compressed gas having a first temperature, via a first regeneration conduct connected to the pressure pipe upstream of a cooler and downstream of said compressor, through the first subzone for regenerating drying agent moving through the first subzone using the compression heat of the compressed gas;

guiding a second flow portion of hot, compressed gas having a second temperature, via a second regeneration conduct connected to the pressure pipe upstream of said cooler and downstream of said compressor, said second regeneration conduit being provided with a heating element, through the second subzone, so that the second temperature is higher than the first temperature.

11. The method according to claim 10, wherein the drying zone comprises at least two zones, including a first zone and a second zone respectively; the method additionally comprising the steps:

guiding through the first zone of the drying zone a third flow portion of compressed gas having a third temperature that is different from a fourth temperature of a gas which is guided through the second zone of the drying zone.

12. The method according to claim 11, wherein said first zone is located adjacent said second subzone, and the third temperature is lower than the fourth temperature.

13. The method according to claim 10, wherein the temperature difference between the first temperature and the second temperature is obtained by first heating the second flow portion of compressed gas coming from the compressor by said heating element before guiding said second flow portion through the second subzone.

14. The method according to claim 10, wherein the first flow portion of compressed gas discharged from the compressor is not guided through a heating element before flowing through the first subzone.

* * * * *